(12) United States Patent
Burton

(10) Patent No.: US 7,098,635 B2
(45) Date of Patent: Aug. 29, 2006

(54) REGULATING VOLTAGE APPLIED TO AN INTEGRATED CIRCUIT AND PROXY FREQUENCY

(75) Inventor: Edward A. Burton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 10/750,585

(22) Filed: Dec. 31, 2003

(65) Prior Publication Data
US 2005/0146315 A1 Jul. 7, 2005

(51) Int. Cl.
G05F 1/40 (2006.01)
H02M 1/00 (2006.01)

(52) U.S. Cl. ..................................... 323/266
(58) Field of Classification Search ................ 323/234, 323/265, 266, 268, 271, 282, 293; 363/144, 363/147; 257/207, 208
See application file for complete search history.

(56) References Cited

U.S. PATENT DOCUMENTS

| 3,757,199 A | 9/1973 | Minks |
| 3,934,189 A | 1/1976 | Schamel |
| 4,302,802 A | 11/1981 | Hyde et al. |
| 4,318,039 A | 3/1982 | Abbott |
| 4,375,077 A | 2/1983 | Williams |
| 4,453,206 A | 6/1984 | Voight |
| 4,791,545 A | 12/1988 | Hinckley |
| 4,827,366 A | 5/1989 | McNally et al. |
| H1319 H | 6/1994 | Stroup |
| 5,563,498 A | 10/1996 | Candy |
| 5,600,149 A | 2/1997 | ElHatem et al. |
| 6,157,180 A | 12/2000 | Kuo |
| 6,424,128 B1 | 7/2002 | Hiraki et al. |
| 6,552,958 B1* | 4/2003 | Shikata et al. ............. 365/233 |
| 6,772,382 B1* | 8/2004 | Schaber et al. ............. 714/744 |
| 6,911,840 B1* | 6/2005 | Milne et al. ................. 326/38 |

* cited by examiner

Primary Examiner—Matthew V. Nguyen
(74) Attorney, Agent, or Firm—Schwabe, Williamson & Wyatt, P.C.

(57) ABSTRACT

An apparatus or a system having an integrated circuit (IC) or a microprocessor with an operational circuit, a proxy circuit and a voltage regulator. In various embodiments, the operational circuit operates at a first frequency, and the proxy circuit outputs a periodic signal at a second frequency reflective of a potential of the first frequency. The periodic signal is provided to the voltage regulator controller, which conditionally regulates voltage applied to the IC or microprocessor, based at least in part on the second frequency.

32 Claims, 4 Drawing Sheets

REGULATING VOLTAGE APPLIED TO AN INTEGRATED CIRCUIT AND PROXY FREQUENCY

TECHNICAL FIELD & BACKGROUND

The present invention is related to the field of integrated circuits. More specifically, various aspects of the present invention are related to the detection of the potential of the operational frequency of an integrated circuit, and regulation of voltage applied to the integrated circuit, based at least in part on the detection.

Advances in integrated circuit (IC) technology have led to significant increases in the operational frequencies of IC. Typically, a manufacturer of an IC designs and guarantees the IC to operate properly up to a specification maximum operational frequency, if voltage supplied to the IC is within a targeted voltage range. Generally, to reduce power consumption, it is desirable to operate the IC near the lower end of the targeted voltage range.

In addition to being dependent on the applied voltage, the operational frequency of an IC may also be dependent at least in part on the temperature of the IC, the age of the IC, and/or other factors. Thus, various environmental limits, such as, but not limited to, temperature, voltage and so forth, are specified to facilitate a system designer to manage the usage of the IC, to ensure it functions properly. These environmental limits are typically conservatively specified (guard banded) to accommodate among other things, aging of the IC. The level of conservatism (or magnitude of the guardband) varies from manufacturer to manufacturer, depending in part on the quality experience of the manufacturer.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Embodiments of the present invention include, but are not limited to, an IC having operational circuits and a proxy circuit to output a periodic signal (proxy signal) at a frequency (proxy frequency) reflective of a potential of the operational frequency of the operational circuits, a voltage regulator controller integrated or associated with the IC to regulate voltage applied to the IC based at least in part on the proxy signal provided by the proxy circuit, and a system having such an IC.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
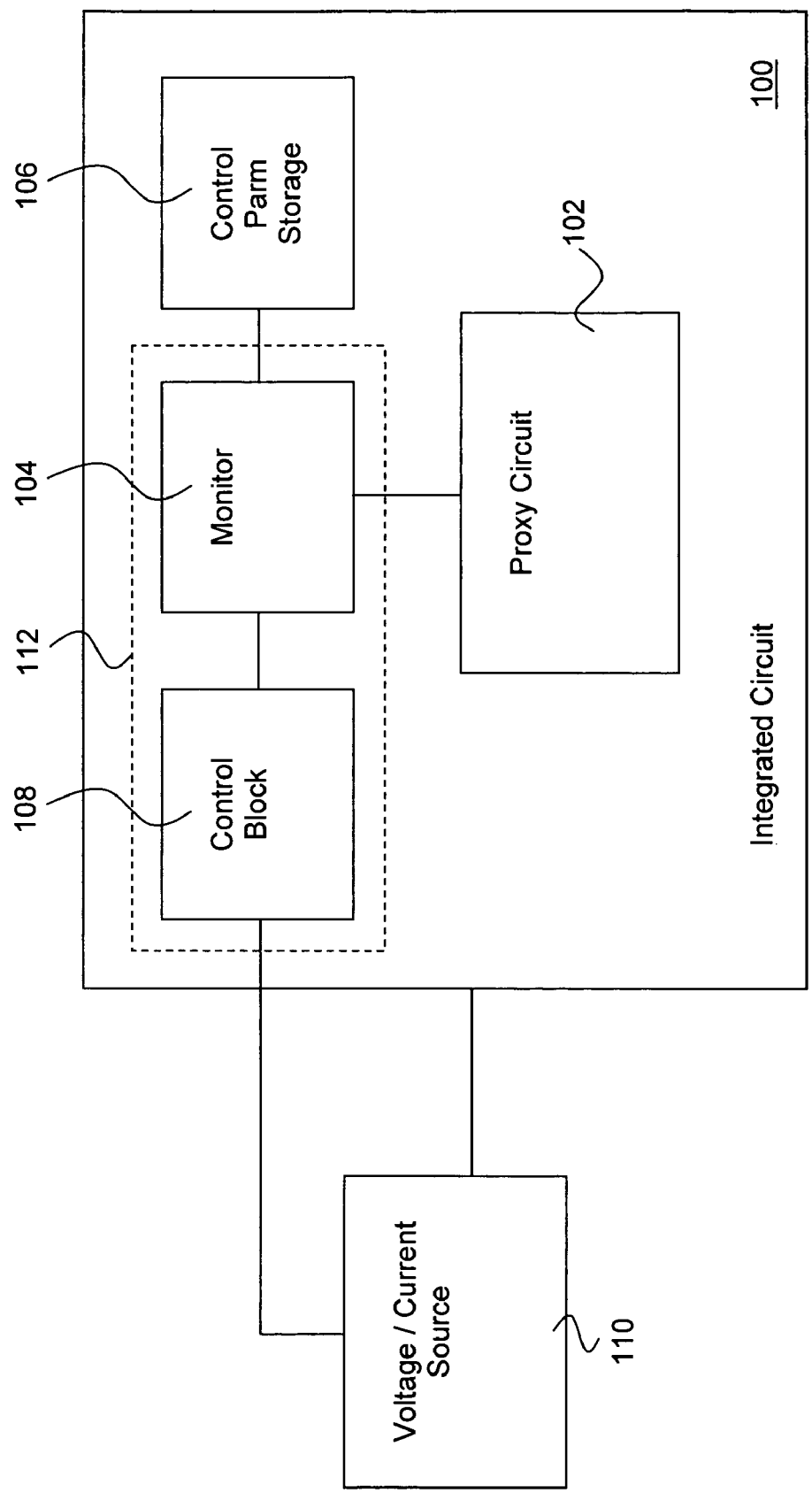
FIG. 1 illustrates a block diagram of an integrated circuit, in accordance with one embodiment of the present invention.

Referring now to FIG. 1, wherein a block diagram view of an IC in accordance with one embodiment, is shown. As illustrated, IC 100 receives its current supply from voltage/current source 110. IC 100 includes a number of operational circuits (not shown). Further, IC 100 advantageously includes proxy circuit 102 (which also draws current from the same source 110). For the illustrated embodiment, IC 100 also includes control parameter storage 106 and light weight voltage regulator controller 112. The illustrated elements are coupled to each as shown.

Operational circuits are employed to provide the functions IC 100 is designed to offer. The functions, and therefore, operational circuits are application dependent, and the application may be of any kind. In one embodiment, IC 100 implements a general purpose microprocessor. In other embodiments, IC 100 may be a graphics processor, a network processor, other application specific integrated circuits (ASIC), or a reconfigurable integrated circuit, such as, but not limited to, Field Programmable Gate Array (FPGA) and so forth.

Proxy circuit 102 is employed to generate a periodic signal (proxy signal) at a frequency (proxy frequency) that is reflective of a potential of the operational frequency of an operational portion of IC 100 of interest (hereinafter, the constituent operational circuit). Recall that the operational frequency is dependent at least in part on the voltage applied, the temperature, and the age of an IC, accordingly, in various embodiments, proxy circuit 102 may be formed at a location of the IC that is near the constituent operational circuit, which operational frequency potential is to be reflected. Such proximal placement allows proxy circuit 102 to substantially experience the same process variations in its formation, as well as ambient influences during operation, as the constituent operational circuit which operational frequency it is to reflect. However, in other applications, for other reasons, proxy circuit 102 need not be so proximally placed.

In various embodiments, proxy circuit 102 is a ring oscillator, which on application of power, continuously generates a periodic signal (proxy signal) at a frequency (proxy frequency). The oscillator toggles per unit time is a measure of frequency. The number of stages or the length of the ring oscillator is implementation dependent. In particular, it may be dependent on the manner the oscillator's frequency is measured. In alternate embodiments, other periodic signal generation circuits may be employed. Further, it is anticipated that in some embodiments, proxy circuit 112 may have configurable elements, to allow customization of the characteristics of the proxy signal.

Light weight voltage regulator controller 112 is employed to conditionally regulate the voltage applied to IC 100 by source 110, based at least in part on the potential of the operational frequency of all or a subset of the operational circuit(s) of IC 100, as reflected by the proxy frequency of the proxy signal. For the illustrated embodiment, voltage regulator controller 112 includes monitor 104 and control block 108, coupled to each other as shown. Voltage regulator controller 112 is referred to as light weight, because for the intended usage, it is not necessary for voltage regulator controller 112 to include elements, such as inductors, bulk caps, and so forth.

For the embodiment, monitor 104 is employed to detect the difference between the proxy frequency and a target of the proxy frequency. The target of the proxy frequency is typically determined at manufacturing time, or more specifically, quality testing time, when the specification maximum of the operational frequency of the constituent operational circuit is determined. The specification maximum of the operational frequency of the constituent operational circuit at a particular temperature, may be determined e.g. through a binary search, while IC 100 is held at the particular temperature. The search may also be conducted employing a voltage reference. Typically, the searches are conducted for a number of temperatures in a temperature range. Other methods may also be employed to determine the specification maximum of the operational frequency. Couple of embodiments of monitor 104 will be described later, referencing FIG. 2–3.

As will be readily apparent from the descriptions to follow, in alternate embodiments, the responsibilities of monitor 104 may be more or less. That is, in these alternate embodiments, some of the responsibilities of monitor 104 may be "pushed out" to control block 108, or vice versa. That is, the demarcation between monitor 104 and control block 106 is partially arbitrarily, and implementation dependent.

For the embodiment, control block 108 is employed to generate control signals for source 110, based at least in part on the outputs of monitor 104. In various embodiments, the control signals control the pulse widths of various transistors employed by source 110 in generating current for IC 100.

In general, control block 108 is employed to generate control signals to decrease the voltage applied to IC 100 if the potential of the operational frequency of the constituent operational portion of IC 100 is believed to be higher than its target operational frequency, and to generate control signals to increase the voltage applied to IC 100 if the potential of the operational frequency of the constituent operational portion of IC 100 is believed to be lower than its target operational frequency.

Further, the amount of increase/decrease is in general a function of the amount of difference detected for the proxy frequency and its target (which may be selected based on a target maximum operational frequency for the constituent operational circuit). However, other factors, such as temperature of IC 100, age of IC 100, as well as precision desired (i.e. granularity of control), may be taken into consideration, in generating the control signals to increase or decrease the voltage and/or current applied. The functional relationship between the adjustment to be undertaken and the factors to be considered, may be linear or non-linear, depending substantially on the design and usage characteristics of IC 100, and it is typically, though not necessarily, empirically determined.

In various embodiments, depending on the sophistication of the models, and therefore, the complexity of the "calculations" required to generate the control signals, control block 108 may be implemented with a relatively simple to a relatively complex circuit, including, but not limited to, a collection of gates configured with combinatorial logic, or a general purpose microcontroller programmed with control logic.

For the embodiment, control parameter storage 106 is employed to store various control parameters. In particular, for the embodiment, it is employed to store the target proxy frequency of the constituent operational portion of IC 100, and various control values to control the operation of voltage regulator controller 112, in particular, monitor 104. In various embodiments, the stored control parameters may also include an upward adjustment as well as a downward adjustment to the target proxy frequency of the proxy circuit, to be described more fully below.

In various embodiments, control parameter storage 106 may be implemented employing non-volatile storage, such as read-only-memory (ROM), electrically erasable ROM (EEPROM), flash memory, and so forth, and/or fuses, i.e. a combination thereof. In other embodiments, control parameter storage 106 may also be implemented employing volatile storage, such as random access memory (RAM) if facilities to save to, and restore from a persistent store of a host device hosting IC 100 are also provided.

Source 110 typically includes a number of transistors, diodes, inductors, capacitors and/or resistors coupled to one another to provide a voltage/current output. Source 110 may be a voltage/current supply of any kind, as long as it is able to meet the voltage and/or current requirement of IC 100, and includes an interface to allow its output voltage to be controlled by control block 108 by controlling e.g. one or more of its transistors.

Resultantly, by virtue of the ability to reliably estimate the operational frequency potential achievable by the operational circuits, and adjust the voltage applied to IC 100 accordingly, it is expected that the specification maximum operational frequency may be achieved with voltage near the lower end of the design voltage range. Thus, it is expected that the specification maximum operational frequency is likely to increase, but at the same time, there will be substantial power savings.

Further, in various embodiments, control parameter storage 106 may also be employed to store various environmental limits to be monitored and managed, to ensure the proper operation of IC 100. Examples of environmental limits include, but are not limited to various critical temperature limits, nominal maximum operational frequency, minimum and maximum voltage, and so forth. These environmental limits are employed by light weight voltage regulator controller 112 and/or various off-chip system management facilities to manage the operation of a host system, of which IC 100 is a component. From the description to follow, it will be appreciated by those of ordinary skill in the art, that by virtue of the novel features and methods of the present invention, typically, these environmental limits may be set more aggressively to "lower" limits. It is expected that employment of various embodiments of the present invention will likely lead to significant reduction in all or selected ones of the typical environmental limits.

Additionally, IC 100 may also include a special mode of operation for the above described calibration and determination of the specification maximum operational frequency (including the target for the proxy frequency), and a number of environmental factor sensors or circuits, such as, but not limited to, voltage sensors, temperature sensors, and so forth, as well as an input terminal for the provision of voltage references, to facilitate the calibration and determination.

While for ease of understanding, voltage regulator controller 112 (with monitor 104 and control block 108) and control parameter storage 106 are being illustrated as part of IC 100, in alternate embodiments, one or more of these elements or sub-elements may be located off chip, on e.g. a circuit board, to which IC 100 is mounted.

Further, while also for ease of understanding, only one proxy circuit 102 is shown, in alternate embodiment, IC 100 may employ multiple proxy circuits 102, one each for different constituent regions. For these embodiments, voltage regulator controller 112 (with monitor 104 and control block 108) and control parameter storage 106 may be modified to cooperate with the multiple proxy circuits 102 (e.g. interleavingly), or multiple sets of these resources, one for each proxy circuit 102 may be provided instead.

Figure 2:
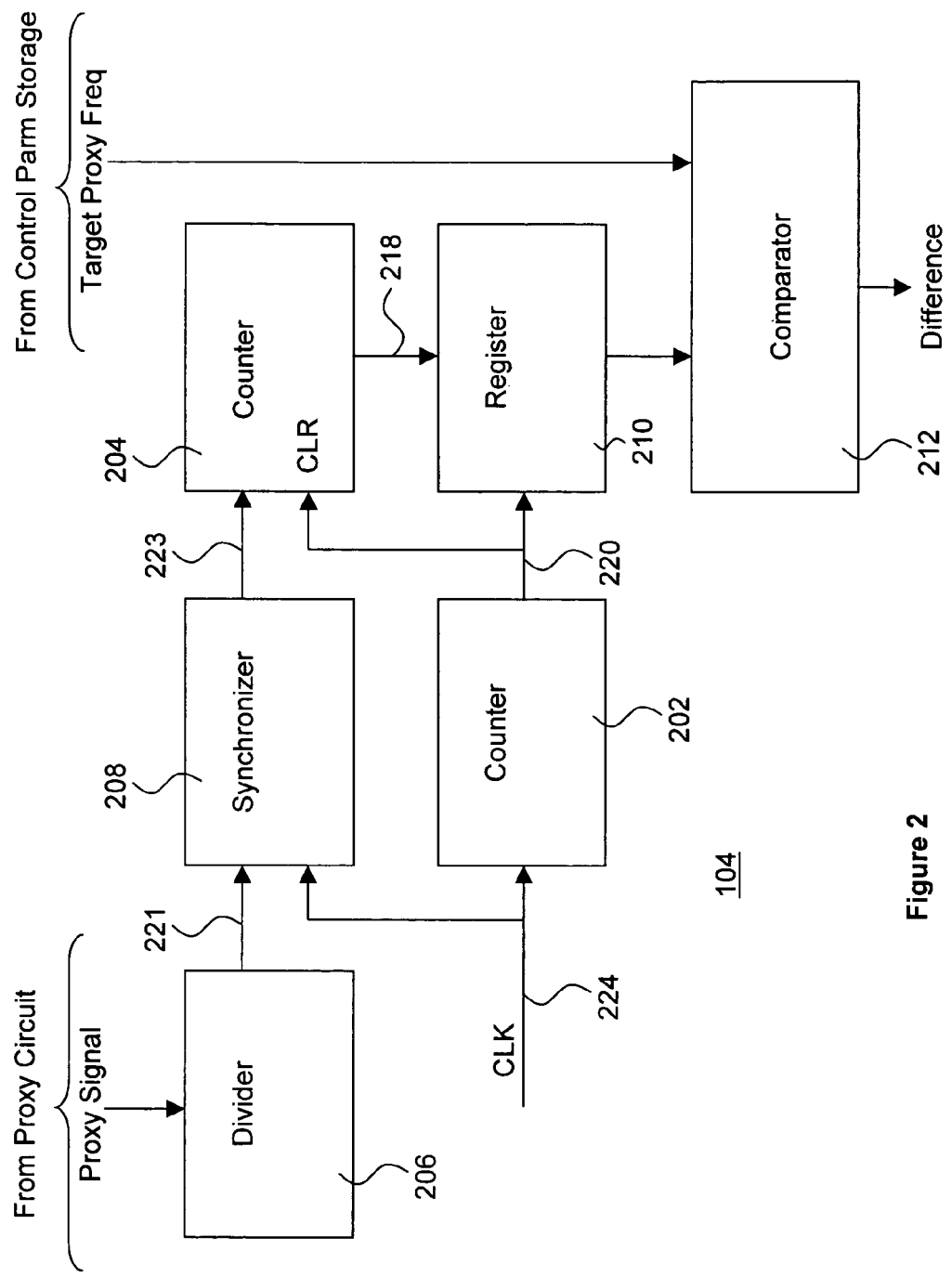
FIG. 2 illustrates the monitor of the voltage regulator controller FIG. 1 in further detail, in accordance with one embodiment.

FIG. 2 illustrates monitor 104 of voltage regulator controller 112 of FIG. 1 in further detail, in accordance with one embodiment. As illustrated, for the embodiment, monitor 104 includes counters 202–204, divider 206, synchronizer 208, register 210, and comparator 212, coupled to each other, proxy circuit 102, and control parameter storage 106 as shown.

Comparator 212 is employed to receive the determined proxy frequency, i.e. frequency of the proxy signal outputted by proxy circuit 102, (from register 210), and a target of the proxy frequency (from control parameter storage 106), and in response, generates an output indicating the difference between the two frequencies.

Counter 204 is employed to sample the proxy signal for a period of time, or more specifically, for the embodiment, a derived version of the proxy signal 213, to determine the frequency of the proxy signal, which as described earlier, is considered reflective of a potential of the operational frequency of the constituent operational circuit(s) of IC 100. Counter 204 includes in particular an input terminal to receive the derived version of the proxy signal 223, which is aligned with the operational cycles of the constituent operational circuit(s), to be described more fully below. Counter 204 further includes a "clear" (CLR) input terminal to receive control signal 220 to periodically clear it, to effectively control the start and stop of sampling (counting) for each time period. Counter 204 further outputs the determined proxy frequency for register 210.

Register 210 is employed to store the determined proxy frequency. Register 210 includes an input terminal to allow the same control signal 220 to be provided to control register 210 to latch the determined proxy frequency outputted by counter 204 at the end of a sampling period, synchronous to the time when counter 204 is being cleared to start sampling for a new time period, and to output a stored determined proxy frequency for comparator 212.

For the embodiment, divider 206 is employed to divide the periodic signal received from proxy circuit 102 to generate a derived version of the periodic signal 221. Typically, this derived version of the periodic signal 221 is not aligned with the operational cycles of the constituent operational circuit(s) of IC 100.

The terms "alignment" or "aligned" as used herein in the specification, and in the claims, refer to edges of the signal pulses being aligned, i.e. they substantially rise and fall together (in phase or phase shifted), but not necessary of the same frequencies. For example, for the purpose of this specification and the claims, a signal with a 200 MHz frequency and a signal with a 100 MHZ are considered aligned, if the edges of the pulses of the slower 100 MHZ signal substantially rise and fall with every other edges of the pulses of the twice as fast 200 MHZ signal (in phase or phase shifted).

Synchronizer 208 is employed to align the derived version of the proxy signal 221 with the operational cycles of the constituent operational circuit(s) of IC 100, and output the aligned version as derived version 223 to counter 204. Thus, synchronizer 208 receives the derived version 221 from divider 206, and clock signal (CLK) 224 as inputs. CLK 224 is a clock signal with a frequency that is either the same or a multiple of the frequency of the clock signal employed to drive the constituent operational circuit(s) (in phase or phase shifted). In other words, as an example, if a clock signal with a 800 MHz frequency is employed to generate a clock signal of 400 MHZ for the constituent operational circuit(s), CLK 224 may be a clock signal with a frequency of either 800 MHZ or 400 MHZ (in phase or phase shifted). Counter 202 is employed to generate control signal 222. Counter 202 receives the same clock signal CLK as input, and counts accordingly. Counter 202 outputs its count as control signal 222.

While the embodiment of FIG. 2 employs counter 204 to determine the frequency of the proxy periodic signal outputted by proxy circuit 102, in alternate embodiments, the frequency of the proxy periodic signal may be determined via other approaches. For example, an implementation with proxy circuit 102 having an m stage oscillator, and counter 204 counting up to n cycles, may also be implemented with proxy circuit 102 having m×n stages, with the proxy frequency being determined based on the amount of delay incurred by a signal traversing through the m×n stages.

Figure 3:
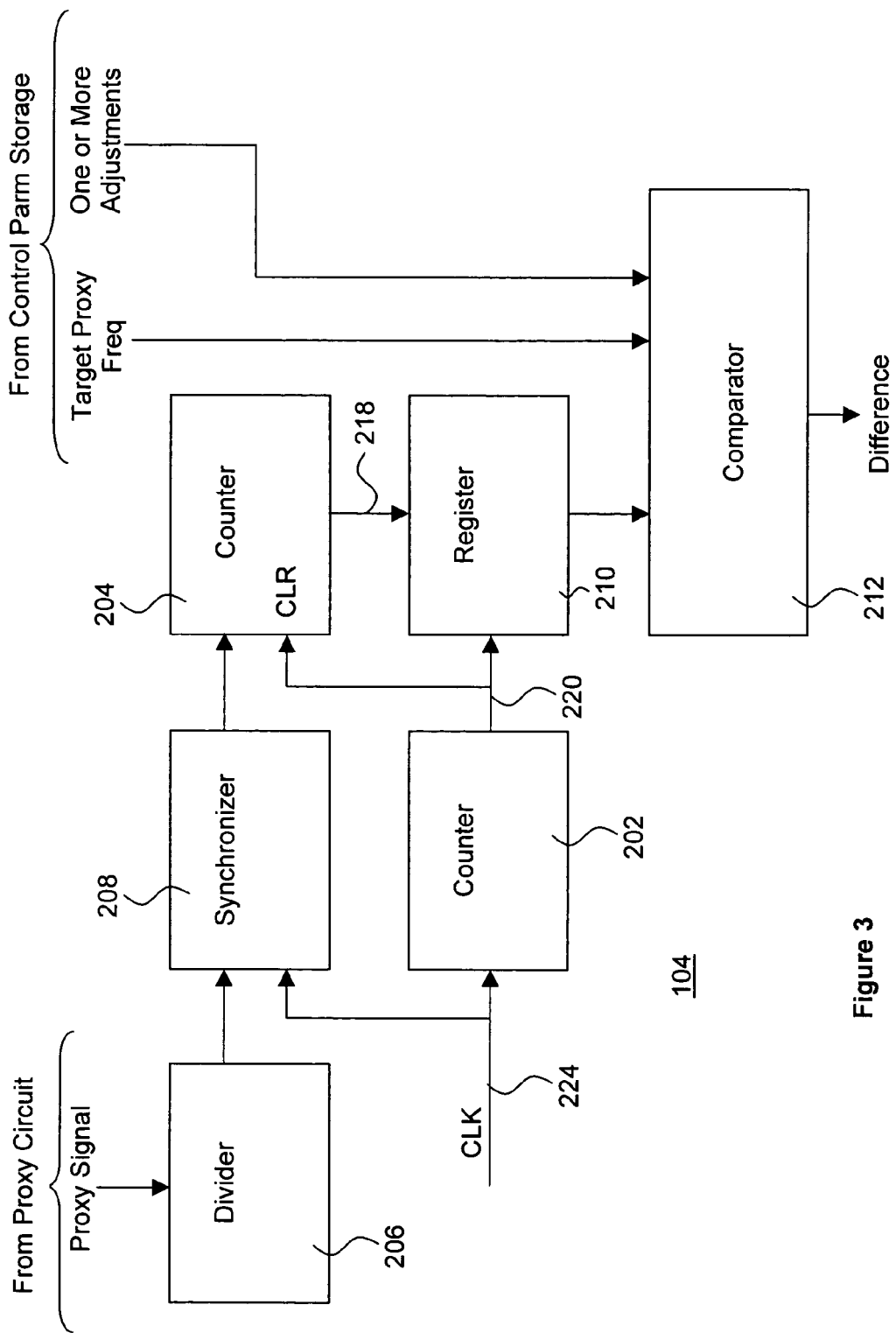
FIG. 3 illustrates the monitor of the voltage regulator controller of FIG. 1 in further detail, in accordance with another embodiment.

FIG. 3 illustrates monitor 104 of FIG. 1 in further detail, in accordance with another embodiment. The embodiment of FIG. 3 is substantially the same as the embodiment earlier described referencing FIG. 2, except that comparator 212 is enhanced to also receive one or more adjustments to the target of the proxy frequency to be taken into consideration when generating the difference between the determined proxy frequency and its target.

In various embodiments, the adjustments include an upward adjustment and a downward adjustment. The adjustments provide a manufacturer of IC 100 with a number of flexibilities in marketing the IC. For example, the upward adjustment may be employed to market IC 100 as a part with a lower specification maximum operational frequency, even though during production, it was tested and confirmed to be capable of operating reliably with a higher unadjusted specification maximum operational frequency. Presumably, IC 100 will be marketed with a downward price adjustment when compared to other IC marketed for operation with the higher unadjusted specification maximum operational frequency. However, subsequently, the downward adjustments may be employed to field upgrade IC 100 to operate with a higher specification maximum operational frequency, which could be as high as the original higher unadjusted specification maximum operational frequency or lower (reflecting the part's age), depending e.g. on the amount of an upgrade payment received. This is just one of many possible applications of the various embodiments of the present invention.

In alternate embodiments, comparator 212 may be merely enhanced to accept only one adjustment to the target proxy frequency. In other words, the adjustments are all summed into a net adjustment, before it is provided to comparator 212.

Note that for the same reason, the earlier described application may be practiced with the embodiment of FIG. 2 if all adjustments are factored into the target proxy frequency before it is provided to comparator 212.

In other words, similar to the earlier description of the demarcation between monitor 104 and control block 108 need not be as described, and may move in either direction with monitor 104 assuming some of the functions of control block 108 or vice versa, likewise, the demarcation between control parameter storage 106 and monitor 104 need not be as described either, and may move in either direction with control parameter storage 106 assuming some of the functions of monitor 104 (in particular, comparator 212), or vice versa.

Figure 4:
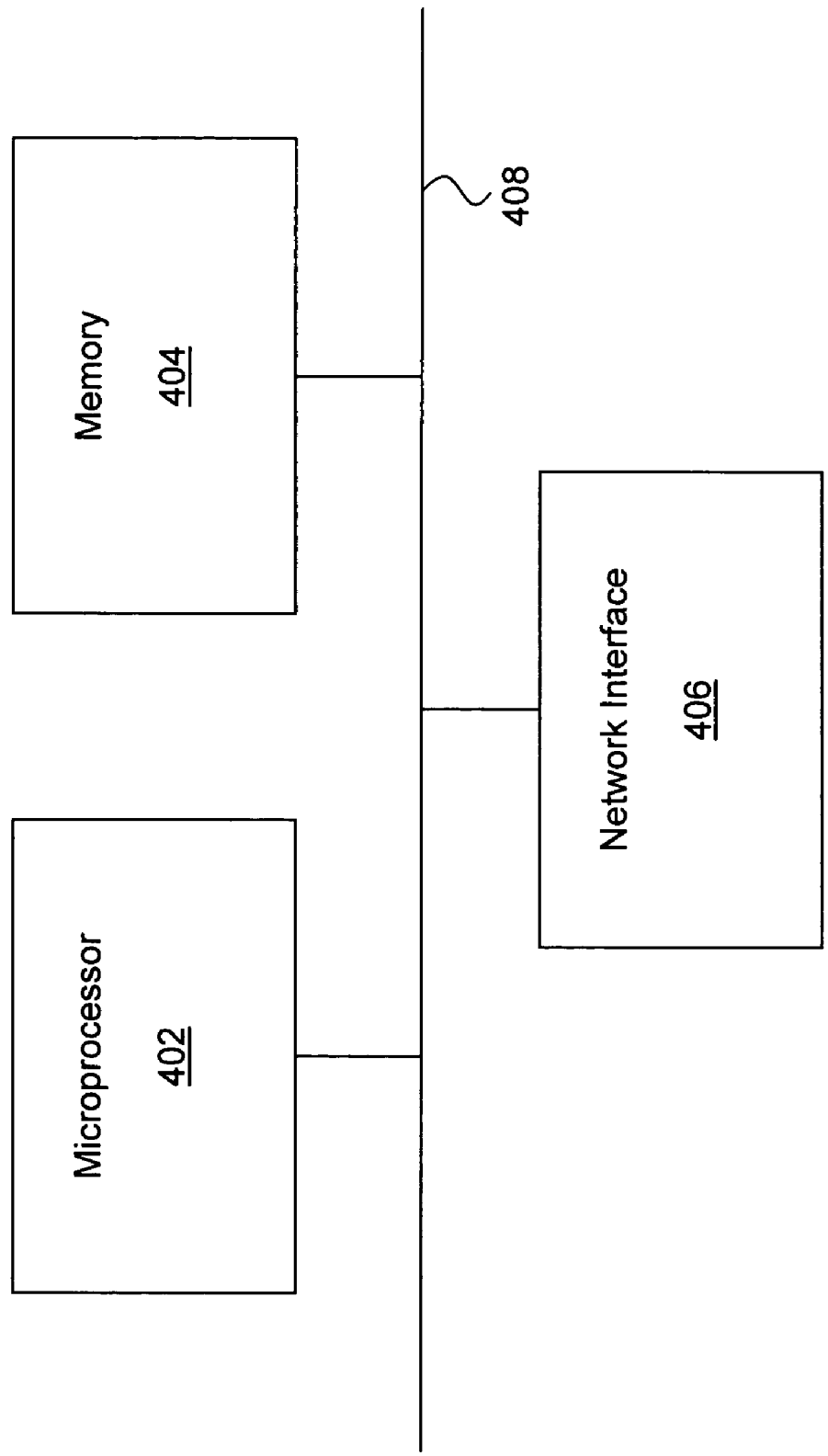
FIG. 4 illustrates a system having the IC of FIG. 1 in accordance with one embodiment.

FIG. 4 illustrates a system in accordance with one embodiment. As illustrated, for the embodiment, system 400 includes microprocessor 402, memory 404, and networking interface 406 coupled to each other, via bus 408. For the embodiment, microprocessor 402 is advantageously equipped with proxy circuit 102, voltage regulator controller 112 (with monitor 104 and control block 108) and control parameter storage 106, as early described for IC 100. Accordingly, the voltage applied to microprocessor 402 may be adjusted in view of the operational frequency microprocessor 402 is believed to be capable of, based on the experience of proxy circuit 102.

Beside the advantageous incorporation of elements 102, 106 and 112, microprocessor 402, memory 404, networking interface 406 and bus 408 all represent corresponding broad ranges of these elements known in the art or to be designed. Further, as described earlier, in alternate embodiments, all or portions of voltage regulator controller 112 may be disposed outside microprocessor 402.

Depending on the applications, system 400 may include other components, including but are not limited to non-volatile memory, mass storage (such as hard disk, compact disk (CD), digital versatile disk (DVD) and so forth), graphical or mathematic co-processors, and so forth.

In various embodiments, system 400 may be a personal digital assistant (PDA), a wireless mobile phone, a tablet computing device, a laptop computing device, a desktop computing device, a set-top box, an entertainment control unit, a digital camera, a digital video recorder, a CD player, a DVD player, or other digital device of the like.

Further, in various applications, system 400 may have multiple microprocessors having integrated or associated voltage regulator controllers as earlier described. Moreover, the multiple microprocessors may be multiple processor cores integrated on the same die.

CONCLUSION AND EPILOGUE

Thus, it can be seen from the above descriptions, a novel apparatus with the ability to regulate the voltage applied to an IC, based on the operational frequency it is believed to be capable of, per its proxy circuit, method for performing the detection and regulation, and a system having such an IC have been described. While the present invention has been described in terms of the foregoing embodiments, those skilled in the art will recognize that the invention is not limited to the embodiments described. The present invention can be practiced with modification and alteration within the spirit and scope of the appended claims.

Thus, the description is to be regarded as illustrative instead of restrictive on the present invention.

What is claimed is:

1. An apparatus comprising:
   an integrated circuit (IC) having
      an operational circuit to operate at a first frequency, and
      a proxy circuit to output a periodic signal at a second frequency reflective of a potential of the first frequency; and
   a voltage regulator controller coupled to the proxy circuit to receive the periodic signal, and conditionally regulate the voltage applied to the IC, based at least in part on the second frequency.

2. The apparatus of claim 1, wherein at least a portion of the voltage regulator controller is part of the IC.

3. The apparatus of claim 1, wherein at least a portion of the voltage regulator is part of the IC and the apparatus is in the IC.

4. The apparatus of claim 1, wherein the proxy circuit comprises a ring oscillator.

5. The apparatus of claim 1, wherein the voltage regulator controller comprises a monitor coupled to the proxy circuit to receive the periodic signal, determine and output a difference signal indicative of an amount of difference between the second frequency and a target of the second frequency.

6. The apparatus of claim 5, wherein
   the apparatus further comprises a first storage to store the target of the second frequency; and the monitor comprises
   a first counter coupled to the proxy circuit to receive a first derived version of the periodic signal for a period of time, determine the second frequency based at least in part on the first derived version of the periodic signal received during the period of time, and output a first count value, indicative of the determined second frequency for the period; and
   a register coupled to the first counter to store the first count value, and output the stored first count value as the determined second frequency; and
   a comparator coupled to the register and the storage to receive the determined second frequency and the target of the second frequency, and to generate and output the difference signal.

7. The apparatus of claim 6, wherein the monitor further comprises
   a divider coupled to the proxy circuit to receive the periodic signal and to generate a second derived version of the periodic signal; and
   a synchronizer coupled to the divider and the first counter to receive the second derived version of the periodic signal and a clock signal, time adjust the second derived version of the periodic signal to form said first derived version of the periodic signal, and to provide the first derived version of the periodic signal to the first counter.

8. The apparatus of claim 7, wherein the monitor further comprises a second counter to receive the clock signal, and outputs a third count value for the first counter and the register to control their operations.

9. The apparatus of claim 6, wherein the apparatus further comprises a second storage to store an adjustment to the target of the second frequency, and the monitor further bases its output of the difference signal on the adjustment to the target of the second frequency.

10. The apparatus of claim 6, wherein the apparatus further comprises a second storage to store an upward adjustment to the target of the second frequency, and third storage to store a downward adjustment to the target of the second frequency, and the voltage regulator controller further bases its output of the difference signal on the upward adjustment as well as the downward adjustment to the target of the second frequency.

11. The apparatus of claim 10, wherein the IC comprises a storage unit, and at least one of the first, second, and third storages are different storage locations of the storage unit.

12. The apparatus of claim 11, wherein the storage unit is a selected one of a read-only-memory, and a random access memory.

13. The apparatus of claim 10, wherein at least a selected one of the first, second, and third storages comprises one or more fuses.

14. The apparatus of claim 5, wherein the voltage regulator controller further comprises a control block coupled to the monitor to receive the difference signal, and generate one or more voltage application control signals to control voltage applied to the IC, based at least in part on the received difference signal.

15. The apparatus of claim 14, wherein at least one of the voltage application control signals controls a pulse width of a voltage signal outputted by a transistor of a device to effect a current outputted by the device.

16. The apparatus of claim 14, wherein the control block comprises a microcontroller.

17. In an apparatus including an integrated circuit (IC) having an operational circuit designed to operate at a first frequency, a method comprising:
   generating a periodic signal at a location on the IC near the operational circuit, the periodic signal having a second frequency reflective of a potential of the first frequency; and
   monitoring the periodic signal to determine the second frequency;
   generating a difference signal indicating an amount of difference between the second frequency and the a target second frequency; and
   regulating voltage being applied to the IC, based at least in part on the amount of difference.

18. The method of claim 17, wherein said generating further comprises applying an adjustment to the target of the second frequency.

19. The method of claim 17, wherein said generating further comprises applying an upward adjustment and a downward adjustment to the target of the second frequency.

20. The method of claim 17, said regulating comprises generating one or more control signals to control a number of electronic elements of a device to effect voltage being applied to the IC, based at least in part on the amount of the difference.

21. A system comprising:
   a first microprocessor having
      a first operational circuit to operate at a first frequency; and
      a first proxy circuit to output a first periodic signal at a second frequency reflective of a potential of the first frequency;
      a first voltage regulator controller, either coupled to, or integrated with the first microprocessor, to receive the first periodic signal, and conditionally regulate voltage applied to the first microprocessor, based at least in part on the second frequency;
   a bus coupled to the first microprocessor;
   a networking interface coupled to the bus.

22. The system of claim 21, wherein at least a portion of the first voltage regulator controller is integrated with the microprocessor.

23. The system of claim 21, wherein the first proxy circuit comprises a ring oscillator.

24. The system of claim 21, wherein the first voltage regulator controller comprises a monitor coupled to the first proxy circuit to receive the first periodic signal, and determine and output a difference signal indicative of an amount of difference between the second frequency and a target of the second frequency.

25. The system of claim 24, wherein
   the system further comprises a first storage to store the target of the second frequency; and
   the monitor comprises
      a first counter coupled to the first proxy circuit to receive a first derived version of the first periodic signal for a period of time, determine the second frequency based at least in part on the first derived version of the first periodic signal received during the period of time, and output a first count value, indicative of the determined second frequency for the period,
      a register coupled to the first counter to store the first count value, and output the stored first count value as the determined second frequency, and
      a comparator coupled to the register and the storage to receive the determined second frequency and the target of the second frequency, and to generate and output the difference signal.

26. The system of claim 25, wherein the monitor further comprises a divider coupled to the first proxy circuit to receive the first periodic signal, and generate a second derived version of the first periodic signal, and a synchronizer coupled to the divider and the first counter, to receive the second derived version of the first periodic signal and a clock signal, to time adjust the second derived version of the first periodic signal, and to provide the time adjusted second derived version of the first periodic signal as the first derived version of the first periodic signal to the first counter.

27. The system of claim 26, wherein the monitor further comprises a second counter coupled to the first counter and the register to receive a clock signal and to output a control signal to control the operations of the first counter and the register.

28. The system of claim 25, wherein the system further comprises a second storage to store an adjustment to the target of the second frequency, and the monitor further bases its output of the difference signal on the adjustment to the target of the second frequency.

29. The system of claim 25, wherein the system further comprises a second storage to store an upward adjustment to the target of the second frequency, and third storage to store a downward adjustment to the target of the second frequency, and the monitor further bases its output of the difference signal on the upward adjustment as well as the downward adjustment to the target of the second frequency.

30. The system of claim 24, wherein the first voltage regulator controller further comprises a control block coupled to the monitor to receive the difference signal, and generate one or more control signals to control electronic elements of a device to affect said voltage being applied to said IC, based at least in part on the received difference signal.

31. The system of claim 21, wherein the system further comprises
- a second microprocessor having
  - a second operational circuit to operate at a third frequency; and
  - a second proxy circuit to output a second periodic signal at a fourth frequency reflective of a potential of the second frequency; and
- a second voltage regulator controller, either coupled to, or integrated with the second microprocessor, to receive the second periodic signal, and conditionally regulate voltage applied to the second microprocessor, based at least in part on the fourth frequency.

32. The system of claim 31, wherein the first proxy circuit and the first voltage regulator of the first microprocessor, and the second proxy circuit and the second voltage regulator of the second microprocessor are configured in a coordinated manner.

* * * * *

UNITED STATES PATENT AND TRADEMARK OFFICE
CERTIFICATE OF CORRECTION

PATENT NO. : 7,098,635 B2  Page 1 of 1
APPLICATION NO. : 10/750585
DATED : August 29, 2006
INVENTOR(S) : Edward A. Burton It is certified that error appears in the above-identified patent and that said Letters Patent is hereby corrected as shown below:

Column 5
Line 49-50, "Counter 204 further outputs the determined proxy frequency for register 210...." should read --...Counter 204 further outputs the determined proxy frequency 218 for register 210....--.

Column 6
Line 23, "...control signal 222..." should read --...control signal 220...--.
Lines 25-26, "...control signal 222..." should read --...control signal 220...--.

Column 7
Line 19, "...system 400..." should read --...the system...--.
Line 37, "...system 400..." should read --...the system...--.
Line 42, "...system 400..." should read --...the system...--.
Line 48, "...system 400..." should read --...the system...--.

Signed and Sealed this

Twenty-third Day of September, 2008

JON W. DUDAS
*Director of the United States Patent and Trademark Office*